(12) United States Patent
Oda

(10) Patent No.: US 6,621,598 B1
(45) Date of Patent: Sep. 16, 2003

(54) COLOR IMAGE READER

(75) Inventor: Akihiko Oda, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/421,500

(22) Filed: Oct. 20, 1999

(30) Foreign Application Priority Data

Oct. 22, 1998 (JP) .......................................... 10/300742

(51) Int. Cl.[7] .......................... H04N 1/024; H04N 1/04; H04N 1/40; G06K 9/22; G06K 9/00
(52) U.S. Cl. ...................... 358/473; 358/486; 358/445; 358/448; 382/313; 382/318
(58) Field of Search ................................. 358/473, 482, 358/445, 448; 382/313, 318

(56) References Cited

U.S. PATENT DOCUMENTS 5,305,122 A * 4/1994 Hayashi et al. ............. 358/448
6,198,546 B1 * 3/2001 Shimanaka ................. 358/445
6,222,649 B1 * 4/2001 Lavelle et al. .............. 358/505

FOREIGN PATENT DOCUMENTS

JP  8-163316  6/1996

* cited by examiner

Primary Examiner—Edward Coles
Assistant Examiner—Houshang Safaipour
(74) Attorney, Agent, or Firm—McGinn & Gibb, PLLC

(57) ABSTRACT

The present invention provides a color image reader installed on an image reader such as a hand scanner whose reading speed may change during reading. A hand scanner has an encoder sensor which outputs movement amount data to a relative speed monitoring unit. In response to relative hand scanner speed data (normalized value) output from the relative speed monitoring unit, a positional compensation processing unit aligns the R, G, and B signals and outputs the aligned R, G, and B signals 10 Claims, 20 Drawing Sheets

LIGHT

COLOR IMAGE READER

BACKGROUND OF THE INVENTION

1. Field of the Invention

The present invention relates to a color image reader installed on an image data reader such as a hand scanner, and more particularly to a color image reader that reads color image data using a 3-line color sensor.

2. Description of the Related Art

FIG. 16 shows the configuration of a storage-type photoelectric conversion device that reads color images. A 3-line color sensor 100 shown in FIG. 16 has linear image sensors 102B, 102G, and 102R, each with a plurality of linearly-arranged light receiving cells 101, arranged in parallel on the board. A blue filter 103B, a green filter 103G, and a red filter 103R are installed on the surface of each cell column.

On an image data reader with a fixed color image reader including the 3-line color sensor 100, a document containing color images is moved by the transport mechanism, composed of a motor and a transport belt, into the direction perpendicular to the direction in which the cells are arranged on the 3-line color sensor 100. On the other hand, on an image data reader with a movable color image reader including the 3-line color sensor 100, the color image reader is moved by the transport mechanism so that the 3-line color sensor 100 can scan a fixed document.

As shown in FIG. 16, the linear image sensors 102B, 102G, and 102R are spaced a distance of D equivalent to the distance of a few lines corresponding to the resolution. For example, when the linear image sensors 102B, 102G, and 102R each have a resolution of 300 dpi, when the light receiving cell 101 is 8 $\mu$m ×8 $\mu$m in size, and when the linear image sensors 102B, 102G, and 102R are each spaced a distance equivalent to four lines, D is 32 $\mu$m (that is, 4×8 $\mu$m).

The linear image sensor 102G reads a part of color images four lines away from the linear image sensor 102B. Similarly, the linear image sensor 102R reads a part Of color images four lines away from the linear image sensor 102G, and the linear image sensor 102R reads a part of color images eight lines away from the linear image sensor 102B.

FIG. 17 is a timing diagram showing the output from the linear image sensors 102R, 102G, and 102B when the document moves below the 3-line color sensor 100 one line at a constant speed within one unit of storage time. FIG. 18 is a diagram showing the read positions on the document. In FIG. 18, the document is read from top to bottom and the symbol ① indicates one line.

TG in FIG. 17 is a transfer gate signal controlling the storage time of images in the 3-line color sensor 100. As shown in FIG. 17, the linear image sensors 102R and 102B output, at a specific point in time, the fourth line before, and the fourth line after, the line output by the linear image sensor 102G, respectively.

That is, as shown in FIG. 18, when the linear image sensor 102G reads nth line, the linear image sensor 102R reads the (n−4)th line and the linear image sensor 102B reads the (n+4)th line. In other words, when the linear image sensor 102G outputs data from the nth line, the linear image sensor 102R outputs data from the (n−4)th line and the linear image sensor 102B outputs data from the (n+4)th line. While the linear image sensor 102G outputs data from the (n−4)th line to the (n+5)th line, the linear image sensor 102R outputs data from the (n−8)th line to the (n+1)th line and the linear image sensor 102B outputs data from the nth line to the (n+9)th line.

Therefore, when reading images with the use of the 3-line color sensor 100 shown above, it is required that a positional compensation of ±4 lines be made with respect to the linear image sensor 102G.

FIG. 19 is a diagram showing how positional compensation is made. For example, data output from the linear image sensors 102R, 102G, and 102B is once stored in the corresponding buffers. When the 3-line color sensor 100 reads data of the nth line, which was output by the linear image sensor 102G, from the buffer memory, it also reads data, which was output by the linear image sensor 102R before the period of time equivalent to four lines, from the buffer memory (see the arrow in FIG. 18). Similarly, the 3-line color sensor 100 reads data, which was output by the linear image sensor 102B after the period of time equivalent to four lines, from the buffer memory (see the arrow in FIG. 18). This read method allows the R, G, and B data on the same line to be read at the same time. It should be noted that, instead of controlling the positions of the buffer memory from which data is to be read, the timing of writing data into the buffer memory may be controlled.

When the read speed is constant, positional compensation may easily be performed for R, G, and B data as described above. However, for a color image reader, such as a hand scanner, which does not always scan data at a constant speed, positional compensation may not be performed simply by changing the positions of the buffer memory from which data is to be read.

Consider a case, such as the one shown in FIG. 20, in which the read speed is not constant. In FIG. 20, the vertical line indicates the distance for which the image reader moves over the read object. Each box in the figure indicates one unit of storage time of the photoelectric conversion device. For example, the box "C(n−6)" in the R column indicates that the image reader moves over two lines within one unit of storage time. In this case, the image reader moves two times faster than it does over "C(n−7)".

"C(n+x)" indicates image data output by the linear image sensors 102R, 102G, and 102B. In FIG. 20, the numeric value (n±x) in each frame indicates, not the number of lines on a read object such as a document, but the number of lines output by the photoelectric conversion device. For example, when the storage time of the photoelectric conversion device is 2 ms, the numeric value indicates the number of lines output every 2 ms.

In this case, the R data and the B data, which are four lines before and after the G data output by the linear image sensor 102G, cannot be used for positional compensation as for constant speed reading. Instead, as shown in FIG. 20, the G data C(n) on the nth line must be made to correspond to the R data C(n−1) on the (n−1)th line and to the B data C(n+2) on the (n+2)th line. That is, the correspondence among the R, G, and B data is not fixed when the reading speed varies randomly.

Disclosed in Japanese Patent Laid-Open Publication No. Hei 8-163316 is a color image reader that performs positional compensation for R, G, and B data by measuring the document transport speed using a rotary encoder provided on the transport mechanism that transports the document to be read. However, the color image reader disclosed in that publication is not designed for variable-speed reading. It only gives the compensation amount for use when the read speed is changed.

As described above, it is difficult for a color image reader installed on an image data reader such as a hand scanner, whose read speed may change during document reading, to appropriately perform positional compensation for R, G, and B data. This problem remains unresolved.

SUMMARY OF THE INVENTION

It is an object of the present invention to provide a color image reader performing positional compensation for three colors, R, G, and B, appropriately according to the read speed, to prevent a difference in the three colors caused by the time lag.

The color image reader according to the present invention comprising comprises speed monitoring unit for monitoring a read speed of a read object; and positional compensation unit or circuit for compensating positions of image data of primary colors based on a monitoring result of the speed monitoring unit, the image data being output from the photoelectric conversion means.

The positional compensation unit may be configured such that it sequentially stores therein the image data of the primary colors, the image data being output from the photoelectric conversion device and, when outputting the image data of one of the primary colors with the one of primary colors as reference data, selects and outputs the image data of other primary colors from the stored image data according to the monitoring result of the speed monitoring unit, the image data of other primary colors corresponding to a position in the read object where the image data of the one of the primary colors was read.

The positional compensation unit may be configured such that it has a plurality of line memories for the image data of the primary colors and, when outputting the image data of one of the primary colors to be used as the reference data from the plurality of line memories, selects the line memories where the image data of other corresponding primary colors is stored according to the monitoring result of the speed monitoring unit, and outputs the image data from the selected line memories.

The speed monitoring unit may be configured such that it outputs relative values for a reference speed. In particular, the relative values are preferably natural numbers.

The positional compensation unit may be configured such that it performs operation on the relative values output from the speed monitoring unit to select the line memories where the image data of other primary colors is stored.

The positional compensation unit may be configured such that it comprises selectors outputting the image data of the primary colors from the line memories; a relative speed data storage unit storing therein the relative values output from the speed monitoring unit; and selector controllers selecting, when outputting the image data of the reference primary color from the line memories, the line memories where the image data of other primary colors is stored based on the relative speed data stored in the relative speed data storage unit, the relative speed data corresponding to the reference color image data, and sends selection signals to the selectors.

The color image reader may further comprises a secondary-scan direction resolution compensation unit that compensates a secondary-scan direction resolution of the image data of the primary colors output by the positional compensation unit.

The secondary-scan direction resolution compensation unit maybe configured such that it comprises data line memories storing therein the primary color image data output from the positional compensation unit; an output controller outputting the image data from the data line memories a number of times corresponding to the relative value for the reference speed received via the positional compensation unit; and a line density data storage unit storing therein line density data.

The color image reader is a hand scanner.

BRIEF DESCRIPTION OF THE DRAWINGS

Other features and advantages of the invention will be made more apparent by the detailed description hereunder, taken in conjunction with the accompanying drawings, wherein.

DETAILED DESCRIPTION OF THE PREFERRED EMBODIMENTS

The present invention will be described in detail by referring to the attached drawings.

Figure 1:
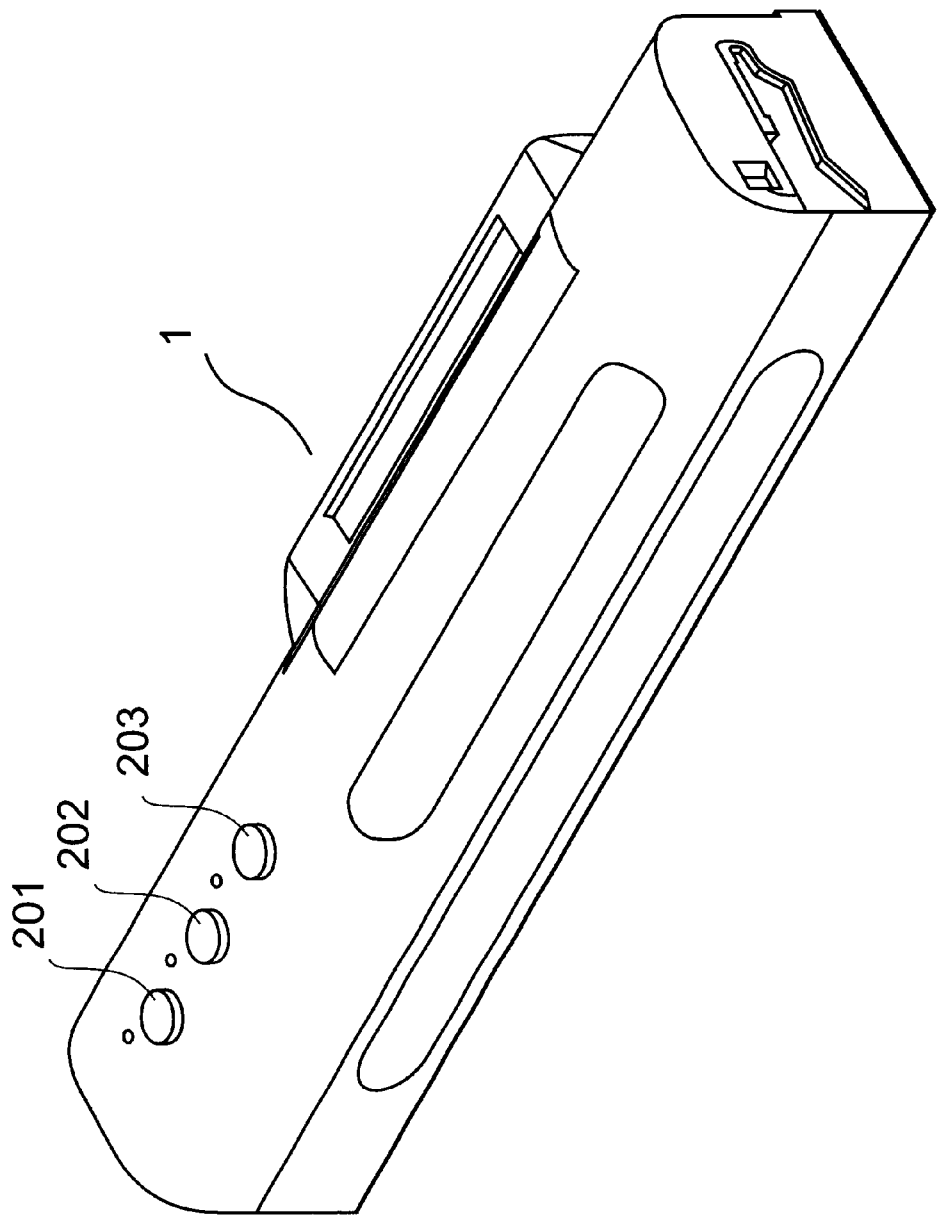
FIG. 1 is a perspective external view of a hand scanner that is one example of an image data reader on which a color image reader is installed.
Figure 2:
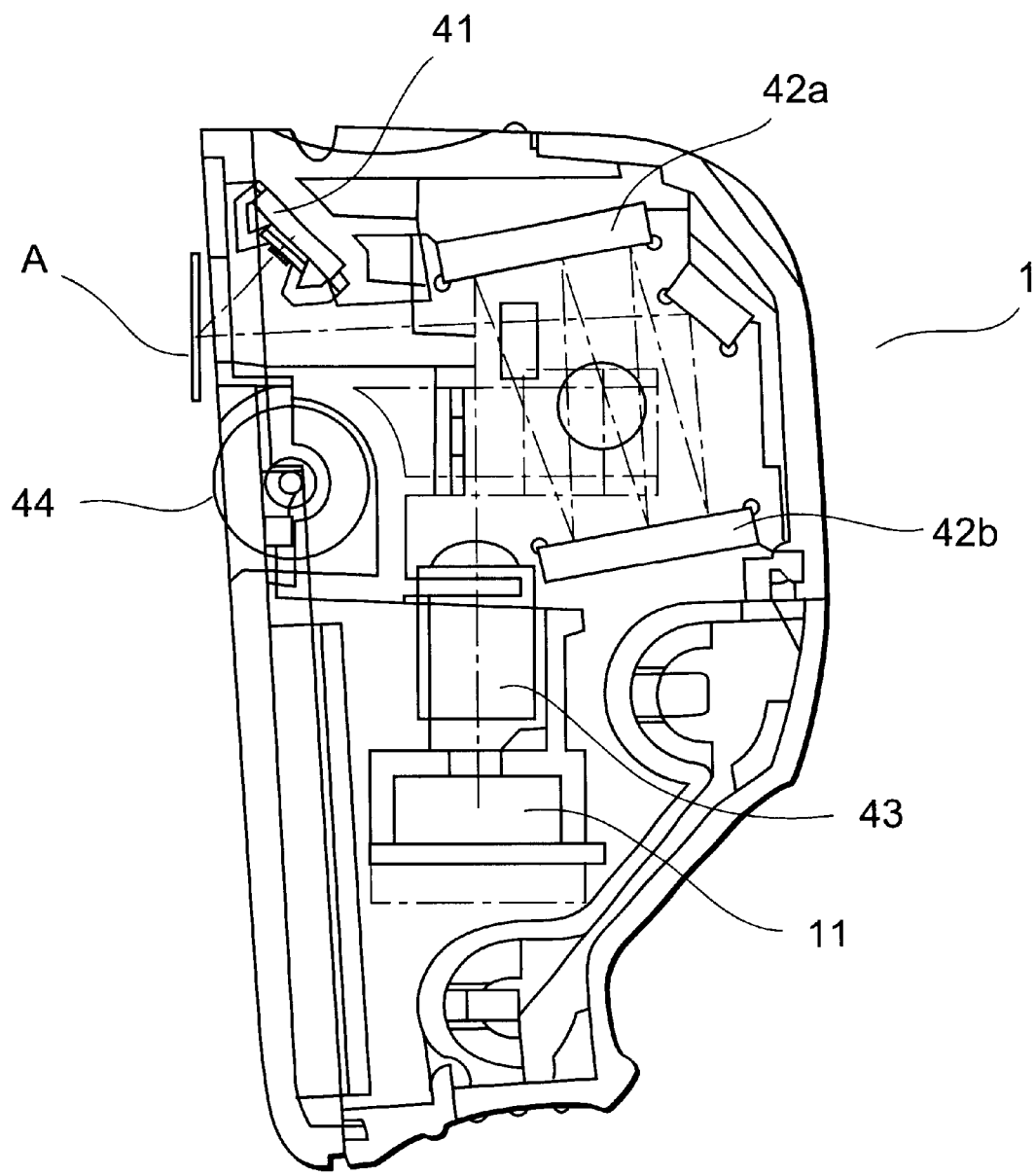
FIG. 2 is a cross section showing the cross section of the hand scanner shown in FIG. 1.

FIG. 1 is a perspective external view of a hand scanner that is one example of an image data reader on which a color image reader according to the present invention is installed. FIG. 2 is a cross section showing cross section of the hand scanner shown in FIG. 1.

Referring to FIG. 1, a hand scanner 1 has a power on/off switch 201, a start button 202, and a stop button 203 on the top.

Figure 16:
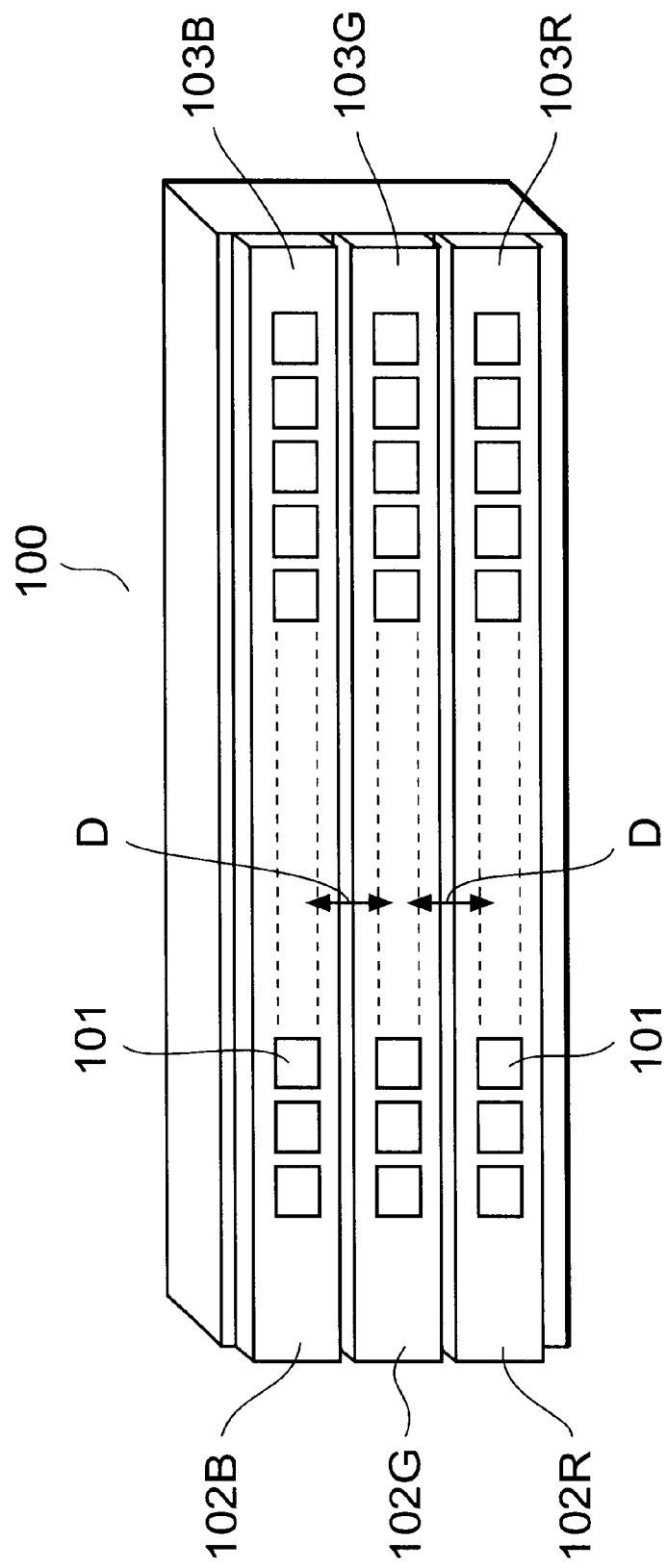
FIG. 16 is a perspective view showing an example of the configuration of a 3-line color sensor.
Figure 17:
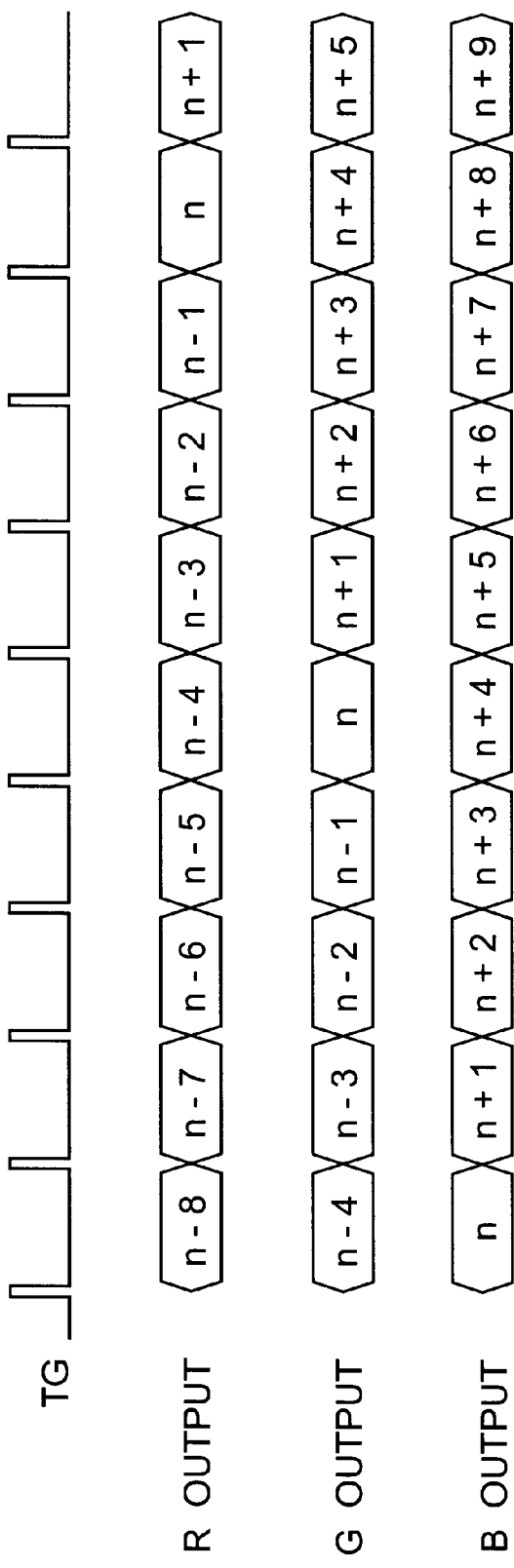
FIG. 17 is a timing diagram showing the output of the linear image sensors of the 3-line color sensor.
Figure 18:
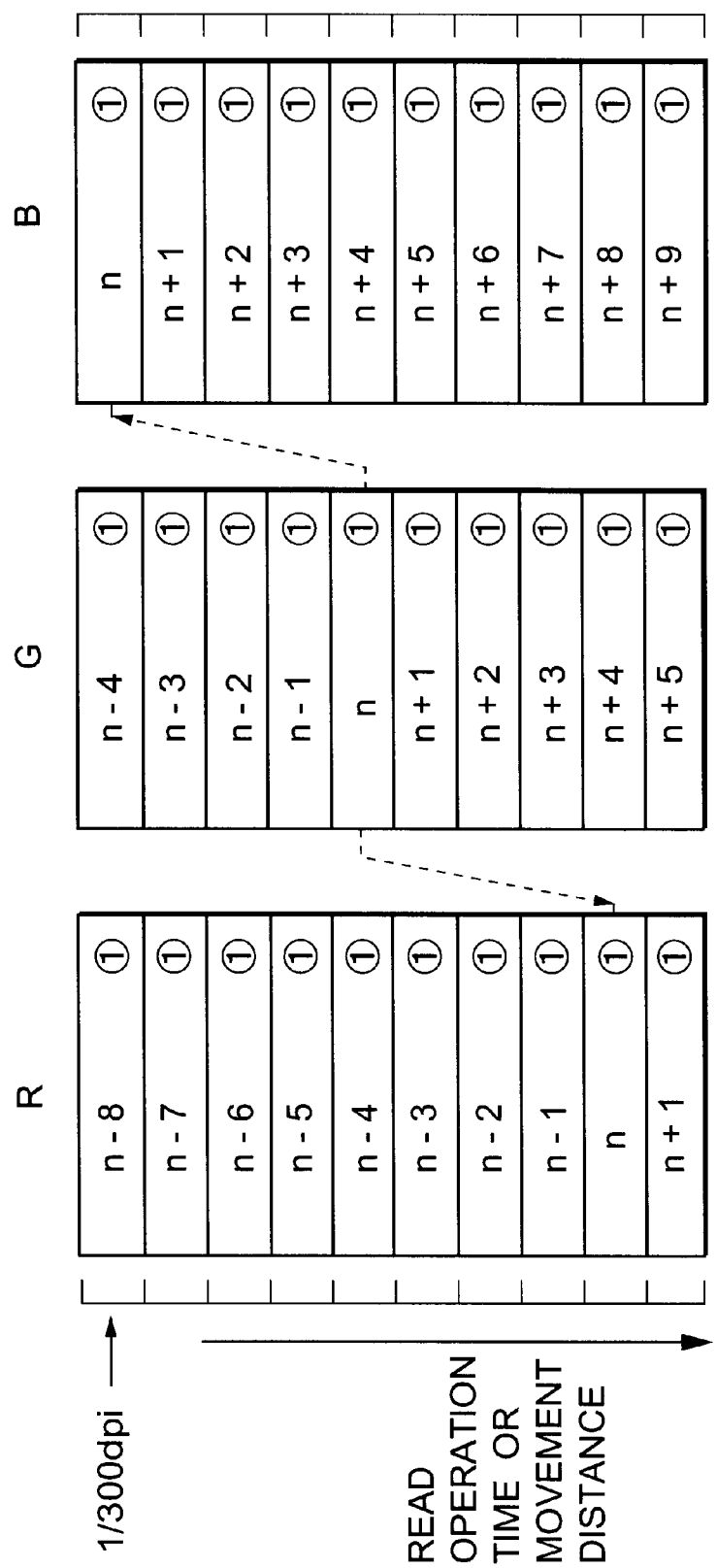
FIG. 18 is a diagram illustrating read positions on a document.
Figure 19:
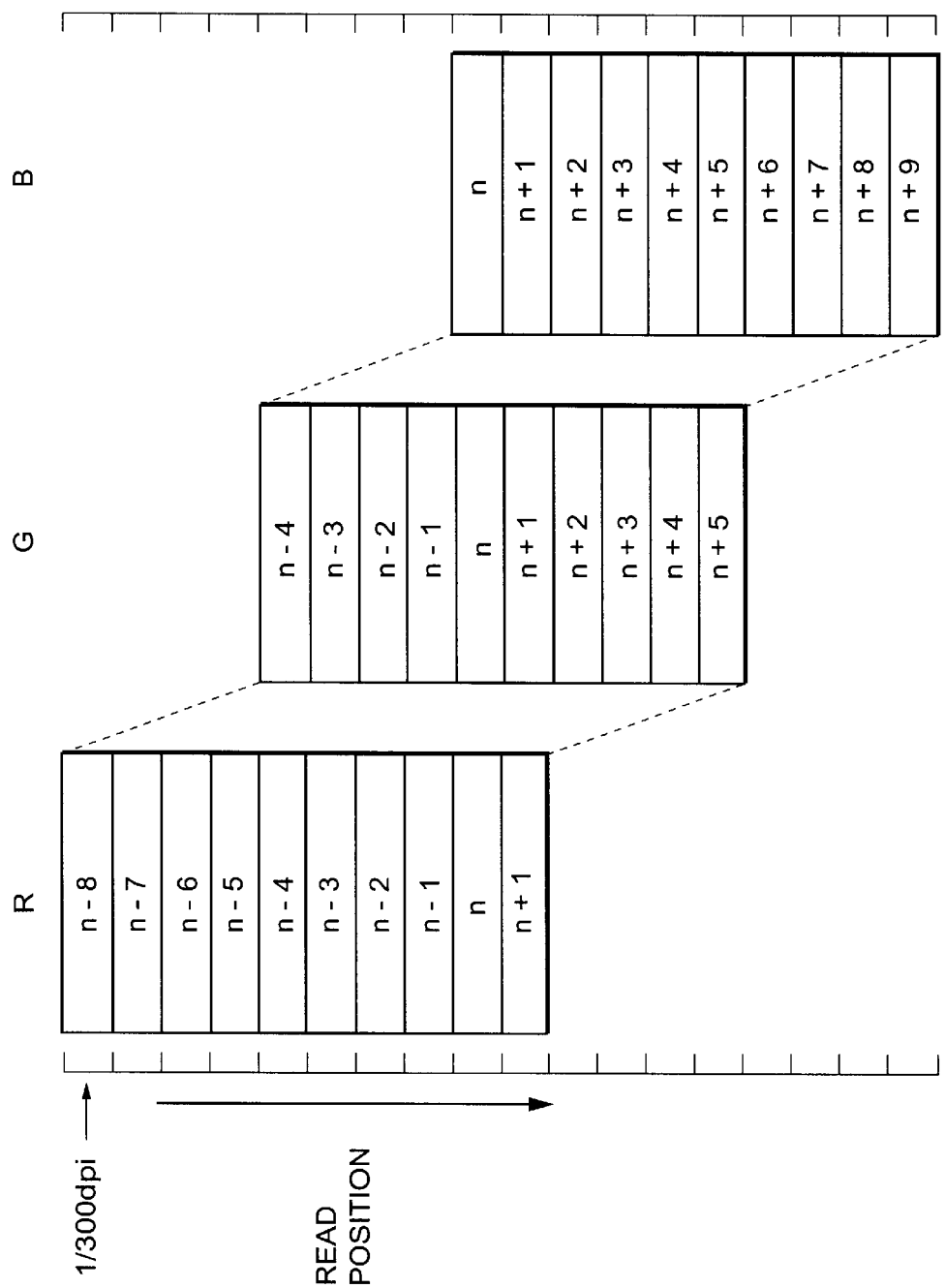
FIG. 19 is a diagram illustrating how positional compensation is performed during scanning at constant speeds.

Also, as shown in FIG. 2, a light source 41 inside the hand scanner 1 emits a light that is reflected on document surface A of a read object. The reflected light, further reflected by mirrors 42a and 42b, enters a photoelectric conversion device 11, which looks like the 3-line color sensor shown in FIG. 16, through a lens 43. In addition, the hand scanner 1 has a roller 44 to make the hand scanner 1 move smoothly.

Figure 3:
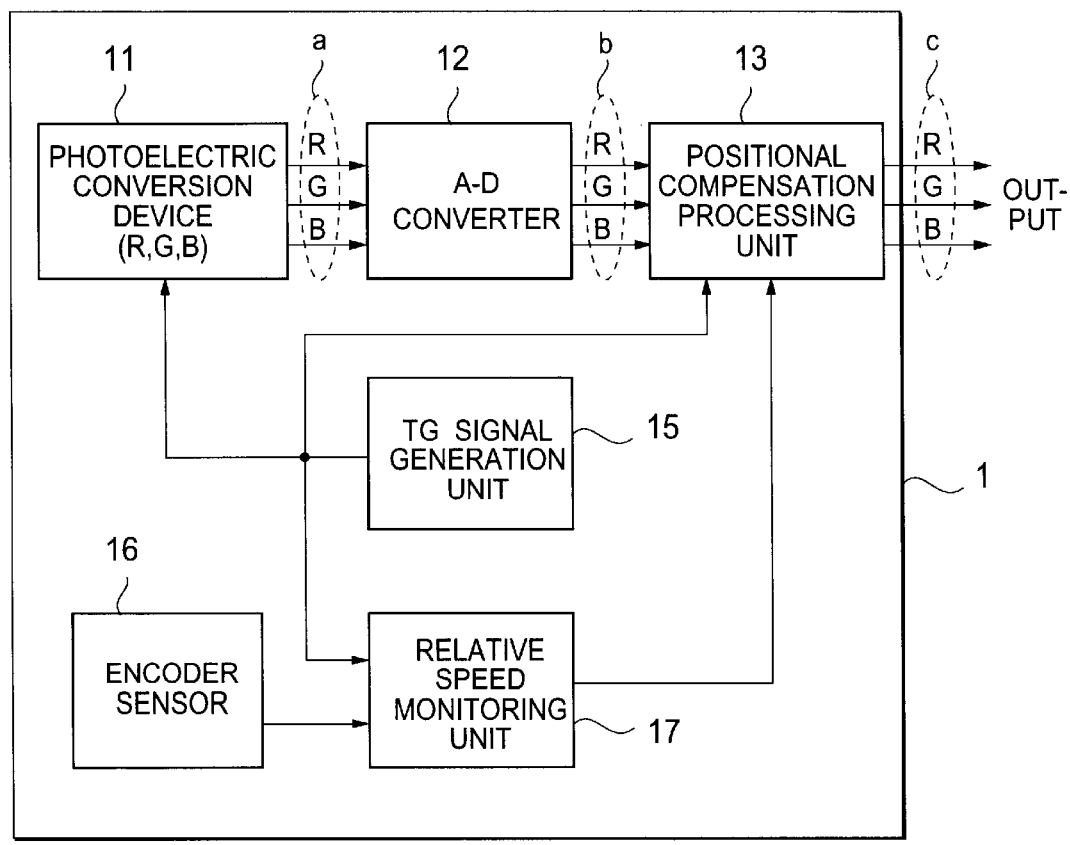
FIG. 3 is a block diagram showing the configuration of a first embodiment of the color image reader according to present invention.

FIG. 3 is a block diagram showing the electrical configuration of the hand scanner 1. The photoelectric conversion device 11 in the hand scanner 1 is a 3-line color sensor which reads a document containing color images and outputs R, G, and B image signals a to an A-D converter 12. The A-D converter 12 converts the R, G, and B image signals a from analog to digital to create digital image signals b (R, G, B signals) and outputs the digital image signals b to a positional compensation processing unit or circuit 13.

The hand scanner 1 has an encoder sensor 16 for measuring the amount of movement. The output of the encoder sensor 16 is sent to a relative speed monitoring unit 17. The transfer gate signal from a TG signal generation unit or circuit 15 is sent to the photoelectric conversion device 11 and, at the same time, to the positional compensation processing unit 13 and the relative speed monitoring unit 17. The positional compensation processing unit 13 aligns the digital image signals b and then outputs the aligned R, G, B signals c.

Figure 4A:
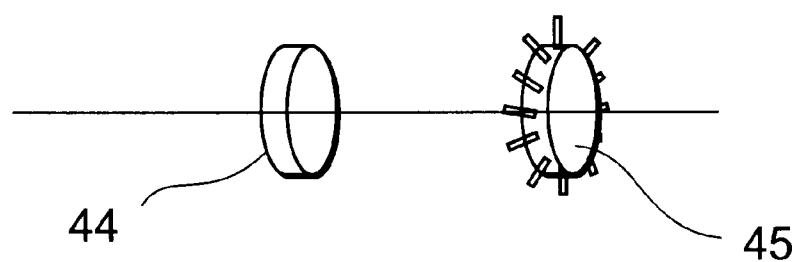
FIGS. 4A and 4B are diagrams illustrating the configuration and operation of an encoder sensor.
Figure 4B:
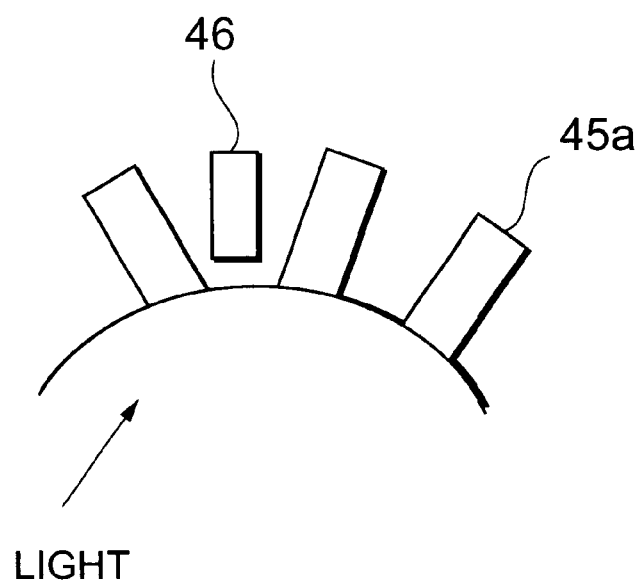

FIG. 4 is a diagram showing the configuration and operation of the encoder sensor. As shown in FIG. 4(A), an encoder 45 is provided on the axis of rotation of the roller 44 shown on the cross section in FIG. 2. Thus, as the roller 44 turns, the encoder 45 also turns. On the circumference of the encoder 45 are provided a plurality of equally-spaced blades 45a. For example, on a hand scanner with the primary resolution of 300 dpi in the secondary scan direction, the blades 45a are provided at an interval such that the encoder 45 moves one pitch each time the hand scanner 1 moves 1/300 inch.

As shown in FIG. 4 (B), the blades 45a are located between the light source (not shown in the figure.) and a light receiving device 46. As the roller 44 turns, the light receiving device 46 receives the light from the light source across the blades 45a only when the light is not blocked by them. Upon receiving the light, the light receiving device 46 outputs the read pulse signal. Therefore, the frequency of the read pulse signal depends on the rotation speed of the roller 44, that is, on the speed of the hand scanner 1.

Figure 5:
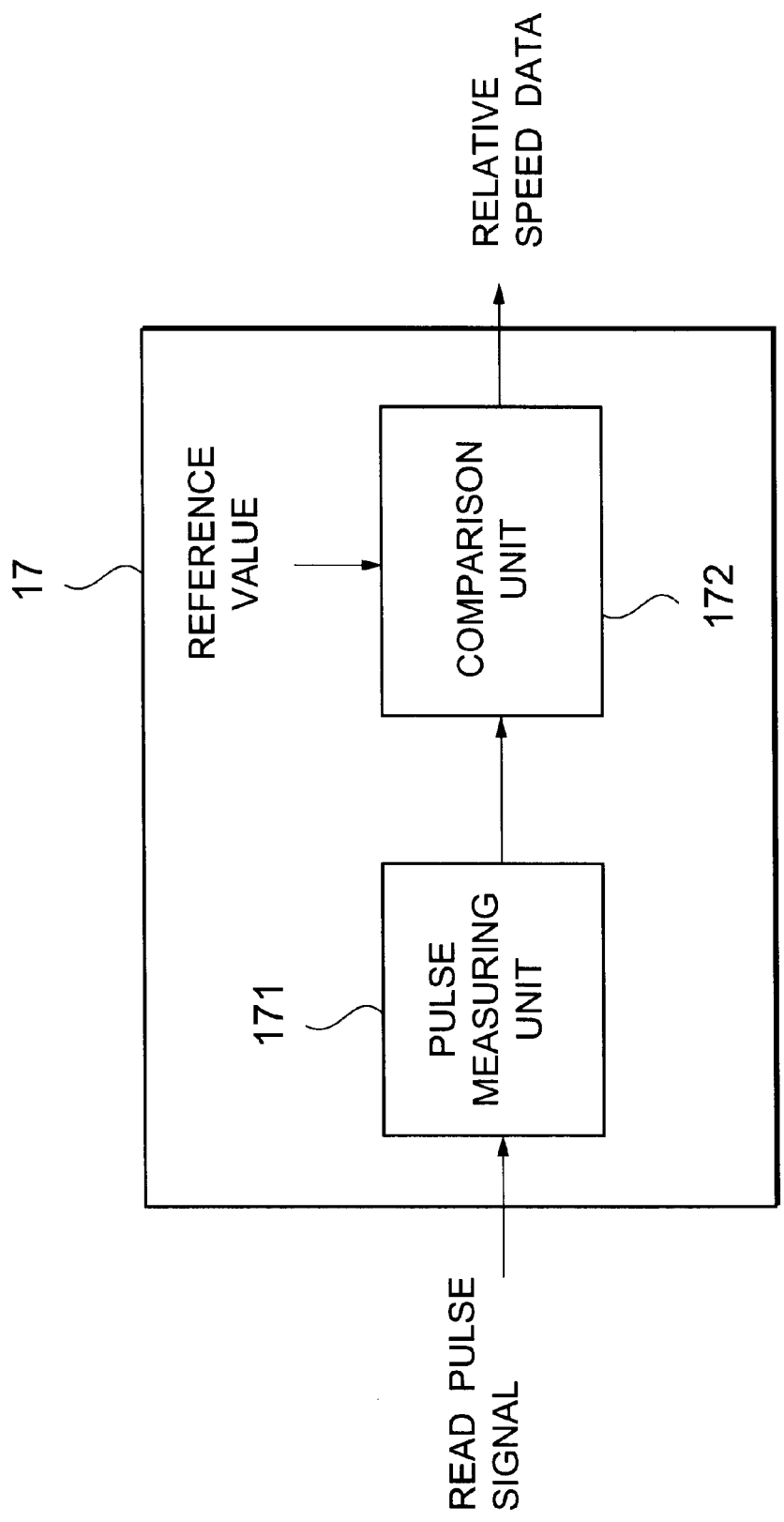
FIG. 5 is a block diagram showing the configuration of a relative speed monitoring unit.

FIG. 5 is a block diagram showing an example of the configuration of the relative speed monitoring unit 17. As shown in FIG. 5, the relative speed monitoring unit 17 includes a pulse measuring unit 171 which receives the read pulse signal from the encoder sensor 16 to count the number of pulses within a predetermined time. A comparison unit 172 compares the measured result with the reference value and outputs relative speed data according to the comparison result. The predetermined time refers, for example, to a time that is set to the storage time of the photoelectric conversion device 11.

Figure 6:
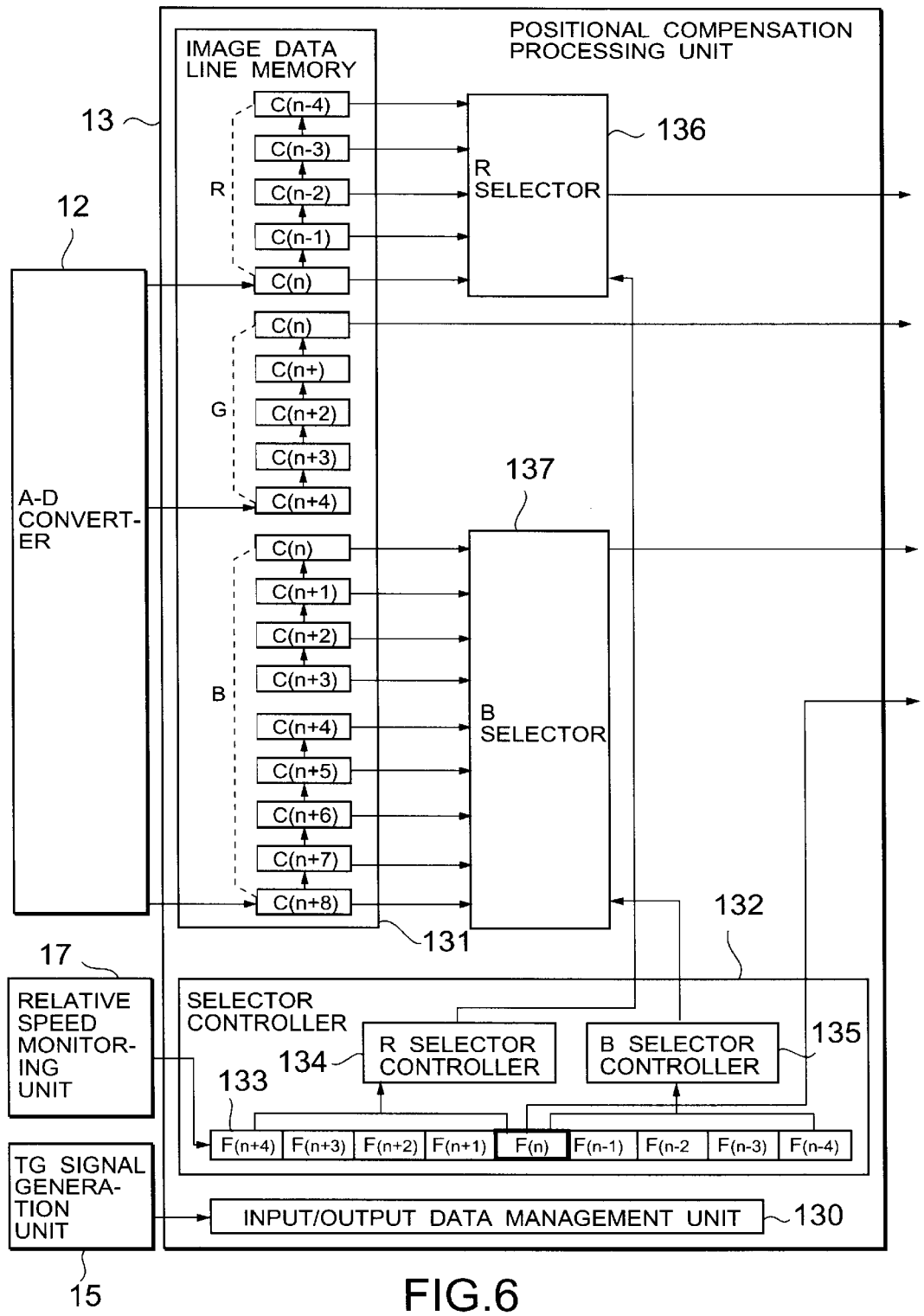
FIG. 6 is a block diagram showing the configuration of a positional compensation processing unit.
Figure 20:
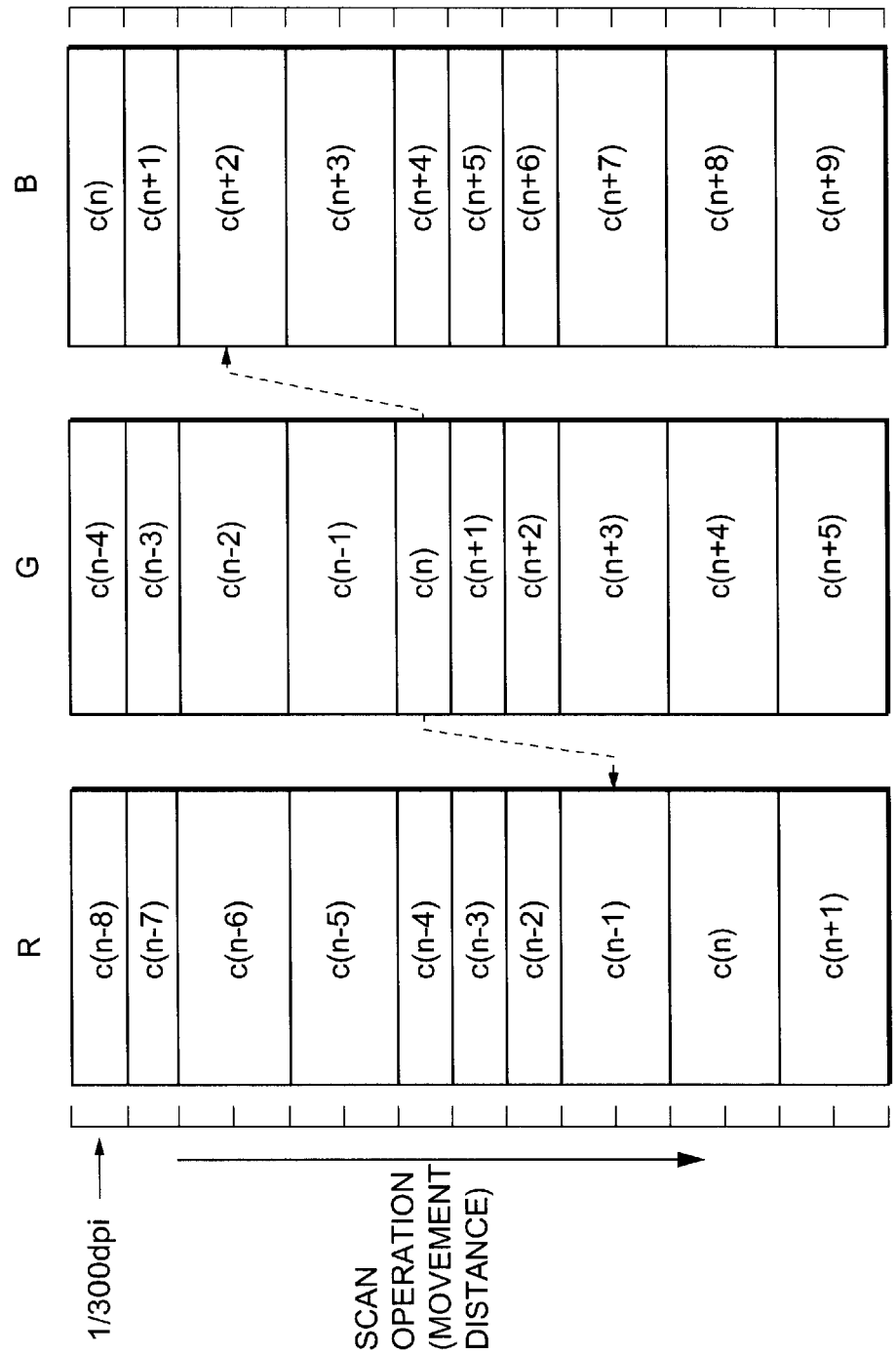
FIG. 20 is a diagram illustrating how positional compensation is performed conventionally at variable speeds.

FIG. 6 is a block diagram showing the configuration of the positional compensation processing unit 13. The positional compensation processing unit 13 performs alignment properly even when the read speed is not constant in such a case as is shown in FIG. 20. As shown in FIG. 6, the one-line R signal from the A-D converter 12 is sent to the R-signal line memory C (n) provided in an image data line memory 131. In this example, five R-signal line memories, C(n) to C(n−4), are provided. When one-line R signal is set in the line memory C(n), the image data (R signal) in the line memories C(n) to C(n−3) are shifted to the line memories C(n−1) to C(n−4).

The one-line G signal from the A-D converter 12 is sent to the G-signal line memory C(n+4) provided in the image data line memory 131. In this example, five G-signal line memories, C(n+4) to C(n), are provided. When one-line G signal is set in the line memory C(n+4), the image data (G signal) in the line memories C(n+4) to C(n+1) are shifted to the line memories C(n+3) to C(n).

The one-line B signal from the A-D converter 12 is sent to the B-signal line memory C(n+8) provided in the image data line memory 131. In this example, nine B-signal line memories, C(n+8) to C(n), are provided. When one-line B signal is set in the line memory C(n+8), the image data (B signal) in the line memories C(n+8) to C(n+1) are shifted to the line memories C(n+7) to C(n)

At the same time the G signal from the photoelectric conversion device 11 is stored in the G-signal line memory C(n) in the image data line memory 131, the R-signal from the photoelectric conversion device 11 is stored in the R-signal line memory C(n−4). Also, the B signal from the photoelectric conversion device 11 is stored at the same time in the B-signal line memory C(n+4).

The relative speed data from the relative speed monitoring unit 17 is sent to a relative speed data storage unit 133 in a selector controller 132. In the example shown, the relative speed data storage unit 133 comprises nine-stage shift registers, F(n+4) to F(n−4). When the relative speed data is sent to register F(n+4), the contents of shift registers F(n+4) to F(n−3) are shifted to F(n+3) to F(n−4). Note that the relative speed data from the relative speed monitoring unit 17 is the relative speed data on the G line. That is, the numeric value of n in registers F(n+4) to F(n−4) equals the numeric value of n in G-signal line memories C(n+4) to C(n). In addition, registers F(n+4) to F(n) contain the relative speed data corresponding to the G-signal line memories C(n+4) to C(n).

An input/output data management unit 130 receives the transfer gate signal from the TG signal generation unit 15 for synchronizing the input/output signals using the signal.

In this embodiment, with the output from the G-signal line memory C(n) as the reference, the R signal and the B signal corresponding to the image data of the G-signal line memory C(n) are selected under control of an R selector controller 134, a B selector controller 135, an R selector 136, and a B selector 137. More specifically, when the G signal is output from the G-signal line memory C(n), the R selector controller 134 selects one of the R-signal line memories, C(n) to C(n−4), from which image data is to be output based on the contents of registers F(n+4) to F(n) The R selector controller 134 outputs the selected result to the R selector 136 as the selection signal. In response to the selection signal, the R selector 136 outputs image data from the corresponding line memory.

Also, the B selector controller 135 selects one of the B-signal line memories, C(n+8) to C(n), from which image data is to be output based on the contents of registers F(n) to F(n−4) The B selector controller 135 outputs the selected result to the B selector 137 as the selection signal. In response to the selection signal, the B selector 137 outputs image data from the corresponding line memory.

In this example, with the secondary-scan reference resolution as 300 dpi, the relative speed monitoring unit 17 outputs the relative speed data of "1" if the movement distance of the hand scanner 1 within one storage time of the photoelectric conversion device 11 is equal to or smaller than 1/300 inch. The relative speed monitoring unit 17 outputs the relative speed data of "2" if the movement distance is larger than 1/300 inch but equal to or smaller than equal 2/300 inch, the relative speed data of "3" if the movement distance is larger than 2/300 inch but equal to or smaller than equal 3/300 inch, and the relative speed data of "4" if the movement distance is larger than 3/300 inch.

It should be noted that the movement distance values for the relative values of "1", "2", "3", and "4" are examples but that other movement distance values may be used for the relative values of "1", "2", "3", and "4". It should also be noted that relative values are not limited to "1", "2", "3", and "4" but that any two or more values may be used.

In that case, the R selector controller 134 selects a line memory to be used according to the following conditions R1 to R5:

R1. If $F(n)-1 \geq 4 \rightarrow R$ (R-signal line memory): select $C(n-4)$.
R2. If $F(n)-1 < 4$ and $F(n)-1+F(n+1) > 4 \rightarrow R$: select $C(n+1-4) = C(n-3)$.
R3. If $F(n)-1+F(n+1) < 4$ and $F(n)-1+F(n+1)+F(n+2) \geq 4 \rightarrow R$: select $C(n+2-4) = C(n-2)$.
R4. If $F(n)-1+F(n+1)+F(n+2) < 4$ and $F(n)-1+F(n+1)+F(n+2)+F(n+3) \geq 4R$: select $C(n+3-4) = C(n-1)$.
R5. If $F(n)-1+F(n+1)+F(n+2)+F(n+3) < 4 \rightarrow R$: select $C(n+4-4) = C(n)$.

Also, the B selector controller 135 selects a line memory to be used according to the following conditions B1 to B4:

B1. If $F(n-1) \geq 4 \rightarrow B$ (B-signal line memory): select $C(n-1+4) = C(n+3)$.
B2. If $F(n-1) < 4$ and $F(n-1)+F(n-2) \geq 4 \rightarrow B$: select $C(n+2-4) = C(n+2)$.
B3. If $F(n-1)+F(n-2) < 4$ and $F(n-1)+F(n-2)+F(n-3) \geq 4 \rightarrow B$: select $C(n-3+4) = C(n+1)$.
B4. If $F(n-1)+F(n-2)+F(n-3) < 4 \rightarrow B$: select $C(n-4+4) = C(n)$.

Referring to FIGS. 7 to 12, the following describes an example of operation performed by the positional compensation processing unit 13. The arrows at the top of FIGS. 9 to 12 indicate that the figure is associated with the preceding figure.

Figure 7:
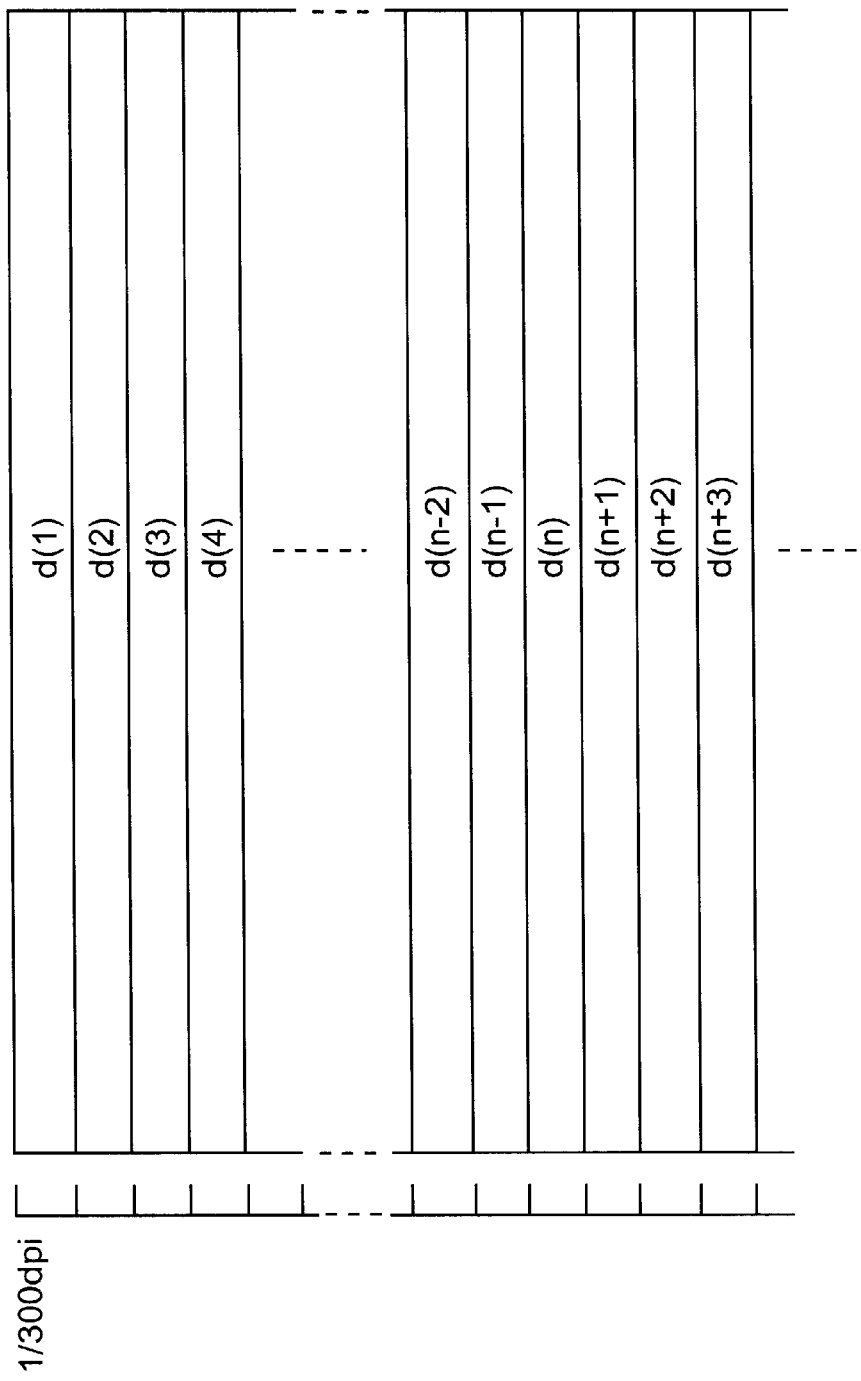
FIG. 7 is a diagram illustrating read positions on a document.

FIG. 7 is a diagram illustrating the definition of lines on read objects such as a document. Because the secondary-scan primary resolution is 300 dpi in this example, the lines, each 1/300 inch in width, are defined as d(l), d(2), . . . , d(n) beginning with the first line.

Figure 8:
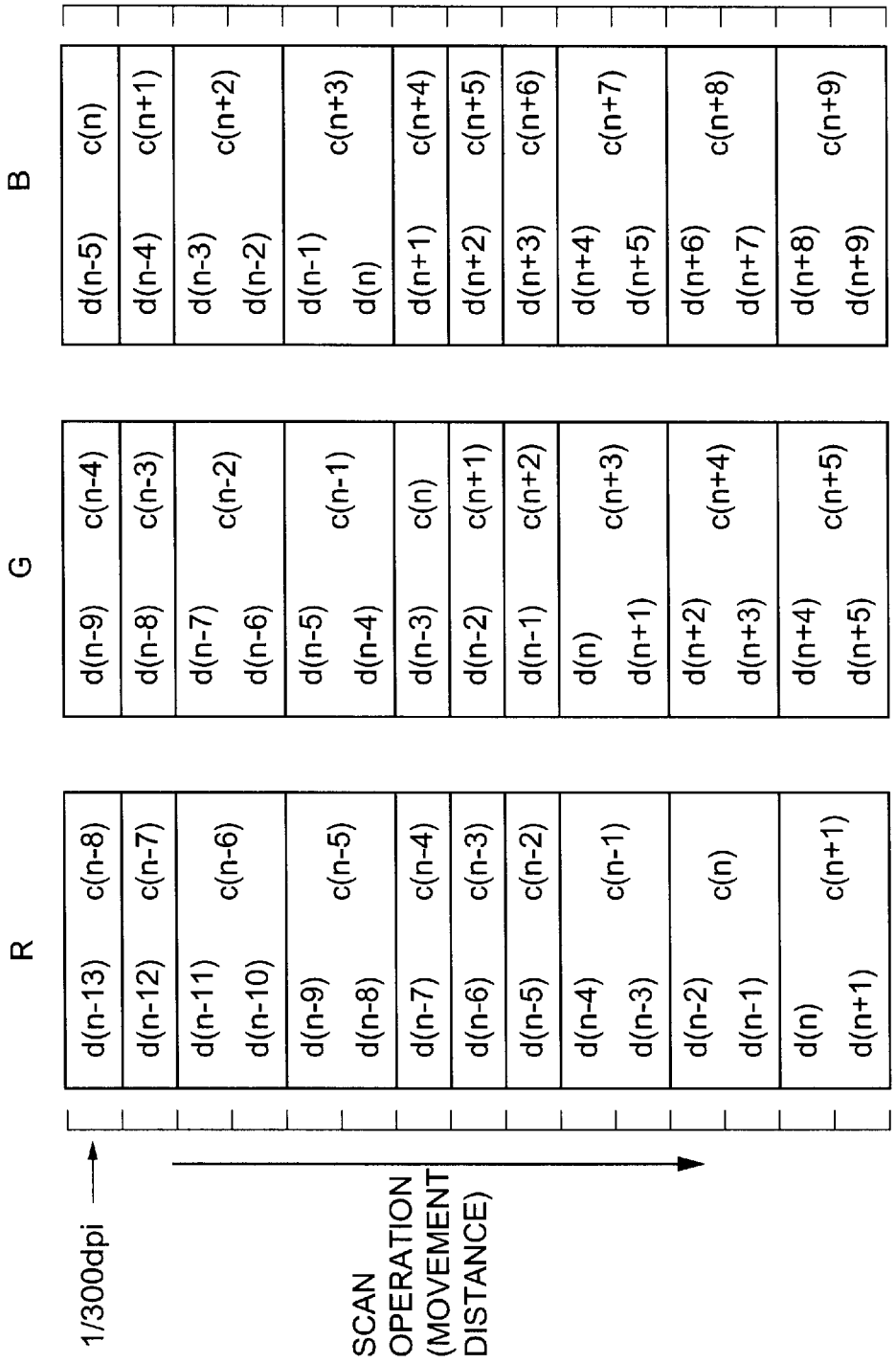
FIG. 8 is a diagram illustrating an example of the scan operation of the hand scanner.

FIG. 8 is a diagram explaining an example of the scan operation of the hand scanner 1. For the G image signals in this example, the image signals on the (n-4)th and (n-3)th lines, which are output from the photoelectric conversion device 11, are those read at the relative speed of "1". The image signals on the (n-2)th and (n-1)th lines are those read at the relative speed of "2".

In this case, note that the line number is the line number of the image signal output from the photoelectric conversion device 11, not the physical line number d(n) on the read object. For example, the image signal on the (n-2)th line output from the photoelectric conversion device 11 is the image signal produced by reading the (n-7)th and (n-6)th lines on the read object (that is, d(n-7) and d(n-6)). That is, the photoelectric conversion device 11 sequentially outputs the image signals at a regular interval corresponding to the storage time. On the d(n-7)th and d(n-6)th lines in this example, the hand scanner 1 moves at a speed twice as fast as the reference speed which is equal to one storage time and, therefore, the d(n-7)th and d(n-6)th lines on the read object are read in one scan operation. One scan corresponds to the one-line image signal output from the photoelectric conversion device 11.

Similarly, for the G signals in FIG. 8, the image signals on the nth to (n+2)th lines output from the photoelectric conversion device 11 are those on the lines read at the relative speed of "1"; the image signals on the (n+3)th to (n+5)th lines are those read at the relative speed of "2". During that period, the hand scanner 1 moves from d(n-3) to d(n+5) on the read object.

At the same time the G signal output from the photoelectric conversion device 11 is stored in the G-signal line memory C(n) in the image data line memory 131 of the positional compensation processing unit 13, the R signal output from the photoelectric conversion device 11 is stored in the R-signal line memory C(n-4) and the B signal output from the photoelectric conversion device 11 is stored in the B-signal line memory C(n+4). Therefore, in the conventional method which does not take the variable scan speed into consideration, the R signal stored in the R-signal line memory C(n-4) and the B signal stored in the B-signal line memory C(n+4), which are four lines before and after the G signal line, respectively, are made to correspond to the G signal stored in the G-signal line memory C(n).

However, in the example shown in FIG. 8, the alignment through such a correspondence would make the G signal on the d(n-3)th line on the read object correspond to the R signal on the d(n-2)th or d(n-1)th line and to the B signal on the d(n-5)th line on the read object. The R signal on the d(n-2)th line or the d(n-1)th line is the R signal produced by reading the d(n-1)th line and d(n-2)th line in one scan. Actually, the signal is a composite signal such as the one produced from the R signal on the d(n-2)th line and the R signal on the d(n-1)th line.

In the example shown in FIG. 8, the correct alignment is implemented by making the G signal on the d (n-3)th line correspond to the R signal on the d(n-3)th line on the read object and to the B signal on the d(n-3)th line on the read object.

Figure 9:
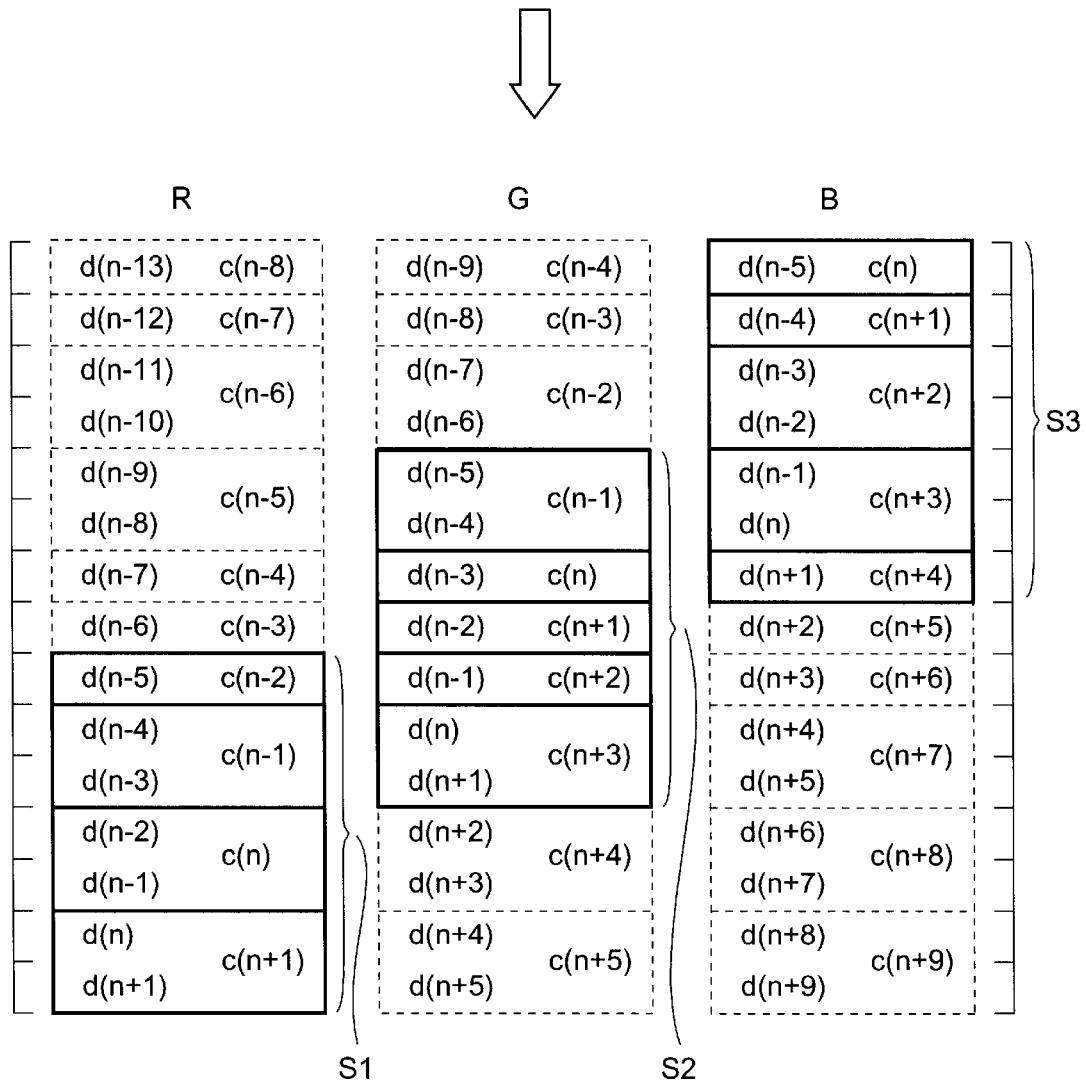
FIG. 9 is a diagram illustrating image data near C(n).
Figure 10:
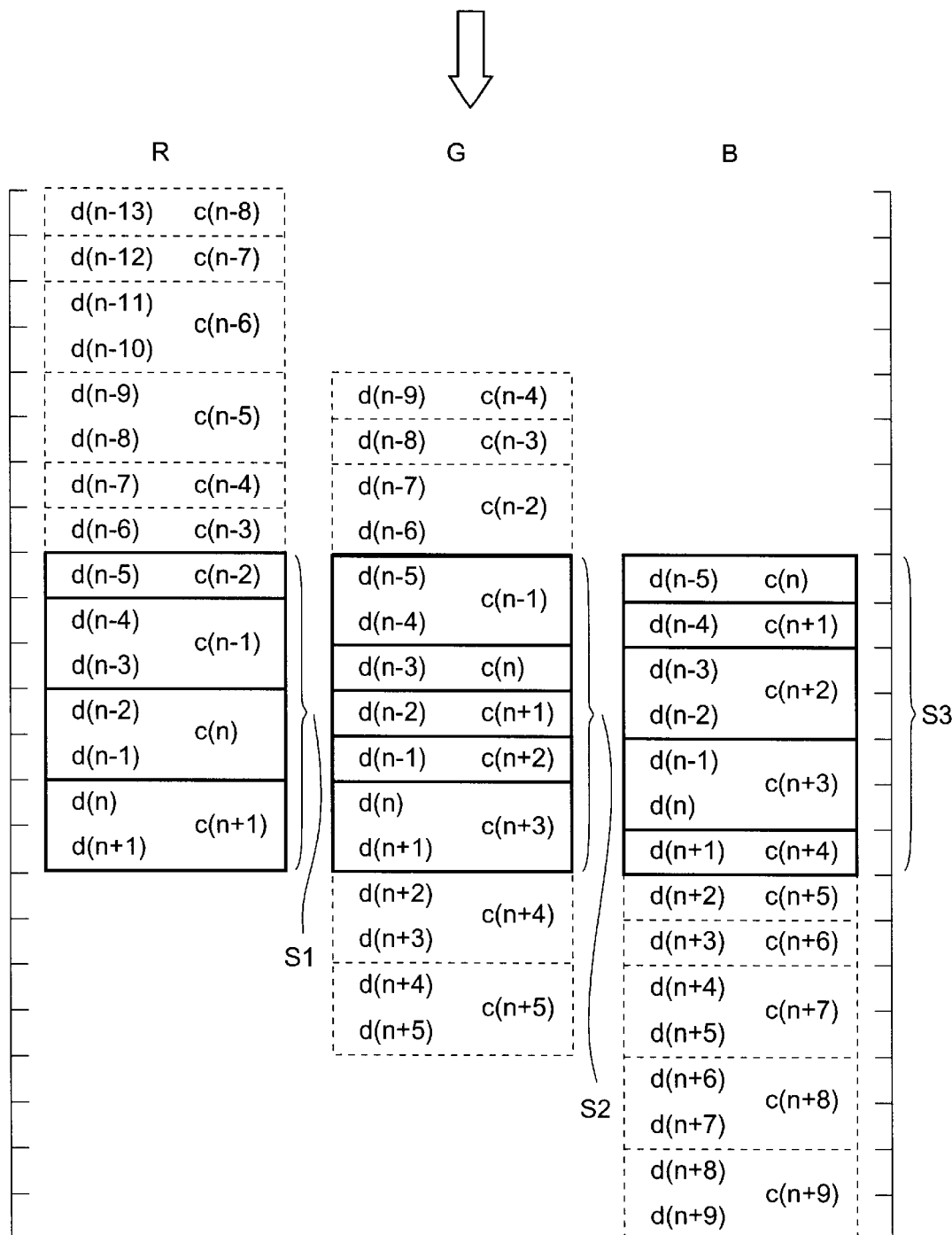
FIG. 10 is a diagram illustrating how the R ,G, and B signals are aligned.

FIG. 9 is a diagram showing the image data near C(n). In the following description, how alignment is performed is described using the image data in solid line boxes S1, S2, and S3. FIG. 10 is a diagram illustrating schematically how alignment is performed. As shown in FIG. 10, the image data in solid line boxes S1, S2, and S3 should be made to correspond to the R, G, and B data in the same position d(x) on the read object.

Figure 11:
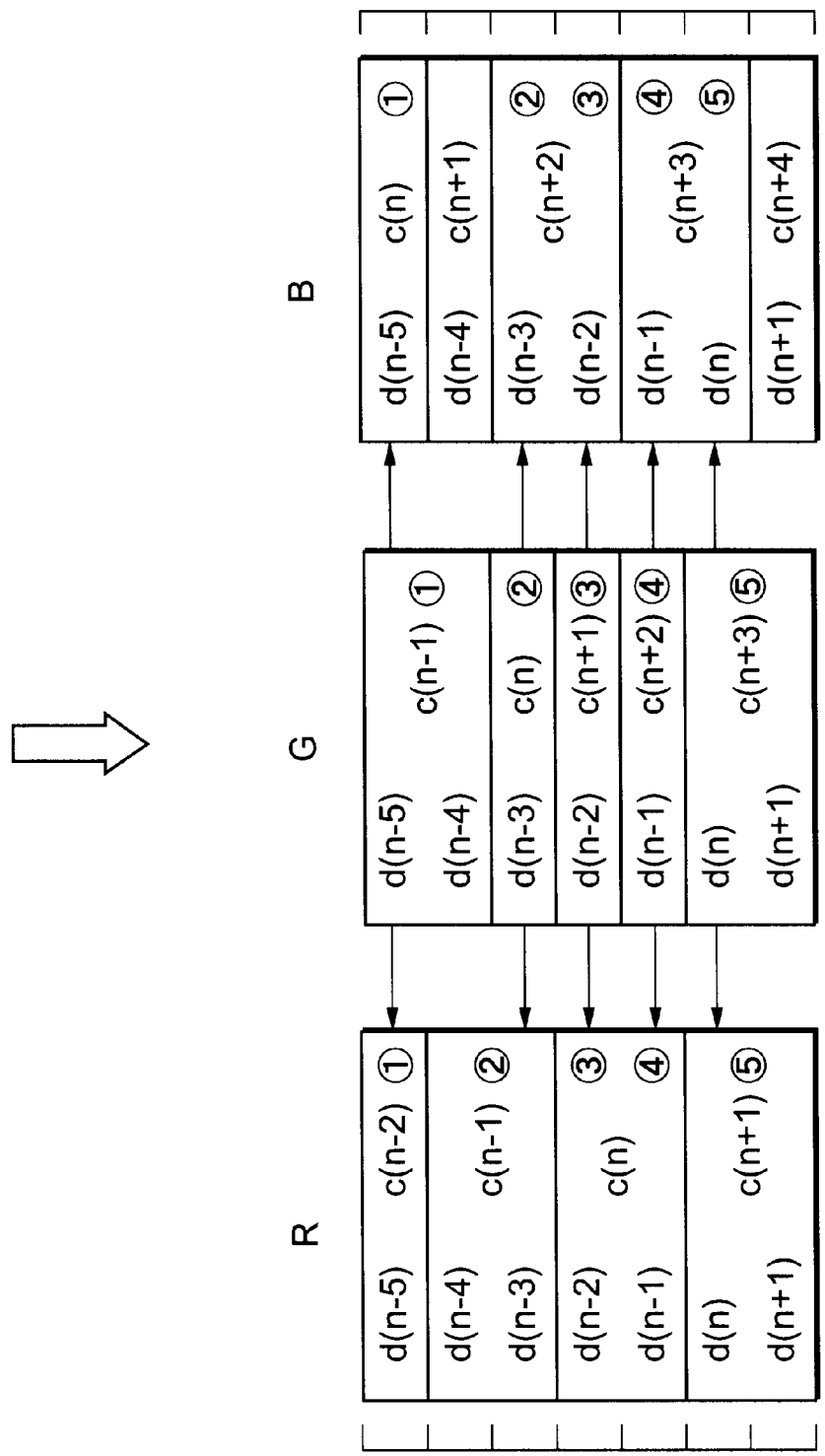
FIG. 11 is a diagram illustrating aligned R, G, and B signals.

Then, as shown in FIGS. 10 and 11, the G signal stored in the G-signal line memory C(n) should be made to correspond to the R signal stored in R-signal line memory C(n-1) and to the B signal stored in the B-signal line memory C(n+2).

The R selector controller 134 in the positional compensation processing unit 13 selects the R-signal line memory storing therein the R signal image data to be output at the same time the image data is output from the G-signal line memory C(n) according to conditions R1 to R5 given above. Similarly, the B selector controller 135 selects the B-signal line memory storing therein the B signal image data to be output at the same time the image data is output from the G-signal line memory C(n) according to conditions B1 to B4 given above.

As described above, the relative speed data storage unit 133 contains the relative speed data corresponding to the G signal. In this example, the relative speed data storage unit 133 contains the following data:

F(n−4)=1
F(n−3)=1
F(n−2)=2
F(n−1)=2
F(n)=1
F(n+1)=1
F(n+2)=1
F(n+3)=2
F(n+4)=2

Application of conditions R1–R5 indicates that condition R4, that is, F(n)−1+F(n+1)+F(n+2)<4 and F(n)−1+F(n+1)+F(n+2)+F(n+3)>4, is satisfied. The R selector controller 134 therefore outputs to the R selector 136 the selection signal indicating that C(n−1) should be selected. Thus, in response to the selection signal from the R selector controller 134, the R selector 136 selects image data from the line memory where the appropriate R signal is stored.

Similarly, application of conditions B1–B4 indicates that condition B2, that is, F(n−1)<4 and F(n−1)+F(n−2)≧4, is satisfied. The B selector controller 135 therefore outputs to the B selector 137 the selection signal indicating that C(n+2) should be selected. Thus, in response to the selection signal from the B selector controller 135, the B selector 137 selects image data from the line memory where the appropriate B signal is stored.

As shown in this example, each time the G signal, which was produced when data was read from the read object sequentially at ①d(n−5), ②d(n−3), ③d(n−2), ④d(n−1) and ⑤d(n), is output, the R signal and the B signal, which were produced when data was read sequentially at ①d(n−5), ②d(n−3), ③d(n−2), ④d(n−1) and ⑤d(n), are output in synchronization with the G signal.

Note that when a plurality of lines d(x') occur in C(x), that is, when a plurality of lines are read from the read object during one scan, the first d(x') is assumed to correspond to C(x) For example, C(n−1) in the G signal column in FIG. 11 corresponds to two lines: d(n−5) and d(n−4). This means that the scanner scans the lines at a speed twice as fast as the reference speed, that the green image sensor of the photoelectric conversion device 11 reads the lines d(n−5) and d(n−4) during that scan, and that the photoelectric conversion output is the G signal represented as C(n−1). However, positional compensation control for C(n−1) is performed assuming that it includes the G signal generated when the d(n−5)th line is read. The same positional compensation control is performed for the R signal and the B signal.

Therefore, the R signal and the B signal on the d(n−5)th line are made to correspond to the G signal generated as the composite of the G signal on the d(n−5)th line and the G signal on the d(n−4)th line. However, since data included on a line is similar to data included on the neighboring lines, the composite of the signals on the d(n−5)th and (n−4)th lines for one color does not cause any problem even if it is made to correspond to the signal on the d(n−5)th line or on the d(n−4)th line for another color.

Similarly, the conditions R1–R5 and B1–B4 given above are set up assuming that, when there are a plurality of d(x') in C(x), the first d(x') corresponds to C(x).

Figure 12:
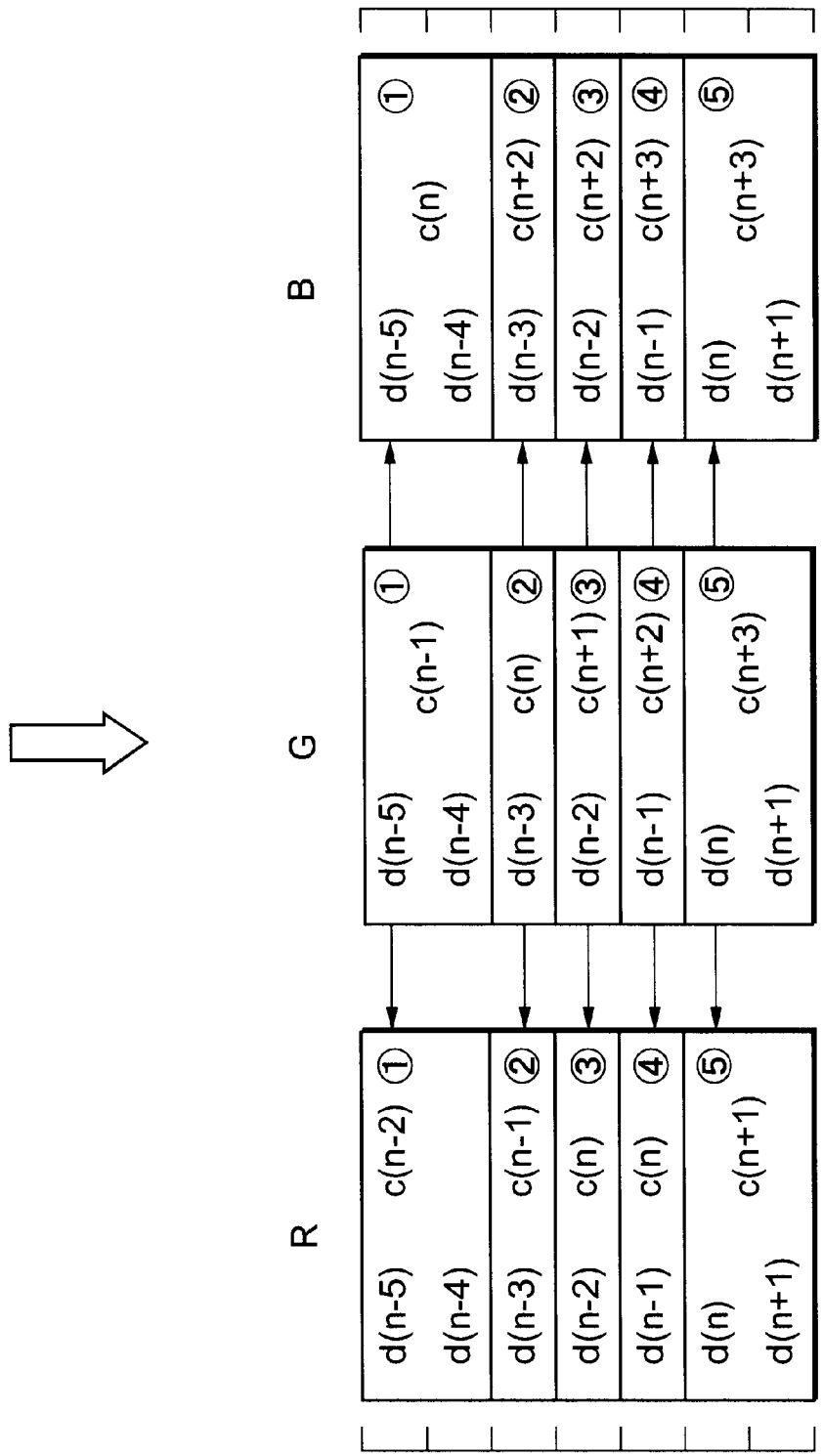
FIG. 12 is a diagram illustrating the effect of alignment.

FIG. 12 shows virtually the same contents as those shown in FIG. 11 except that the effect of positional compensation of this embodiment is illustrated more clearly. That is, FIG. 12 shows that the R selector controller 134 controls the output of R signals such that R signals of C(n−2), C(n−1), C(n), and C(n+1) are output in synchronization with G signals of C(n−1), C(n), C(n+1), C(n+2), and C(n+3), respectively. The figure also shows that the B selector controller 135 controls the output of B signals such that B signals of C(n), C(n+2), C(n+2), C(n+3), and C(n+3) are output in synchronization with G signals of C(n−1), C(n), C(n+1), C(n+2), and C(n+3), respectively.

Thus, the figure clearly shows that, in synchronization with the output of the G signals that are produced when positions ①d(n−5), ②d(n−3), ③d(n−2), ④d(n−1), and ⑤d(n) are sequentially read, the R signals and the B signals that are produced when positions ①d(n−5), ②d(n−3), ③d(n−2), ④d(n−1), and ⑤d(n) are sequentially read are output.

Figure 13:
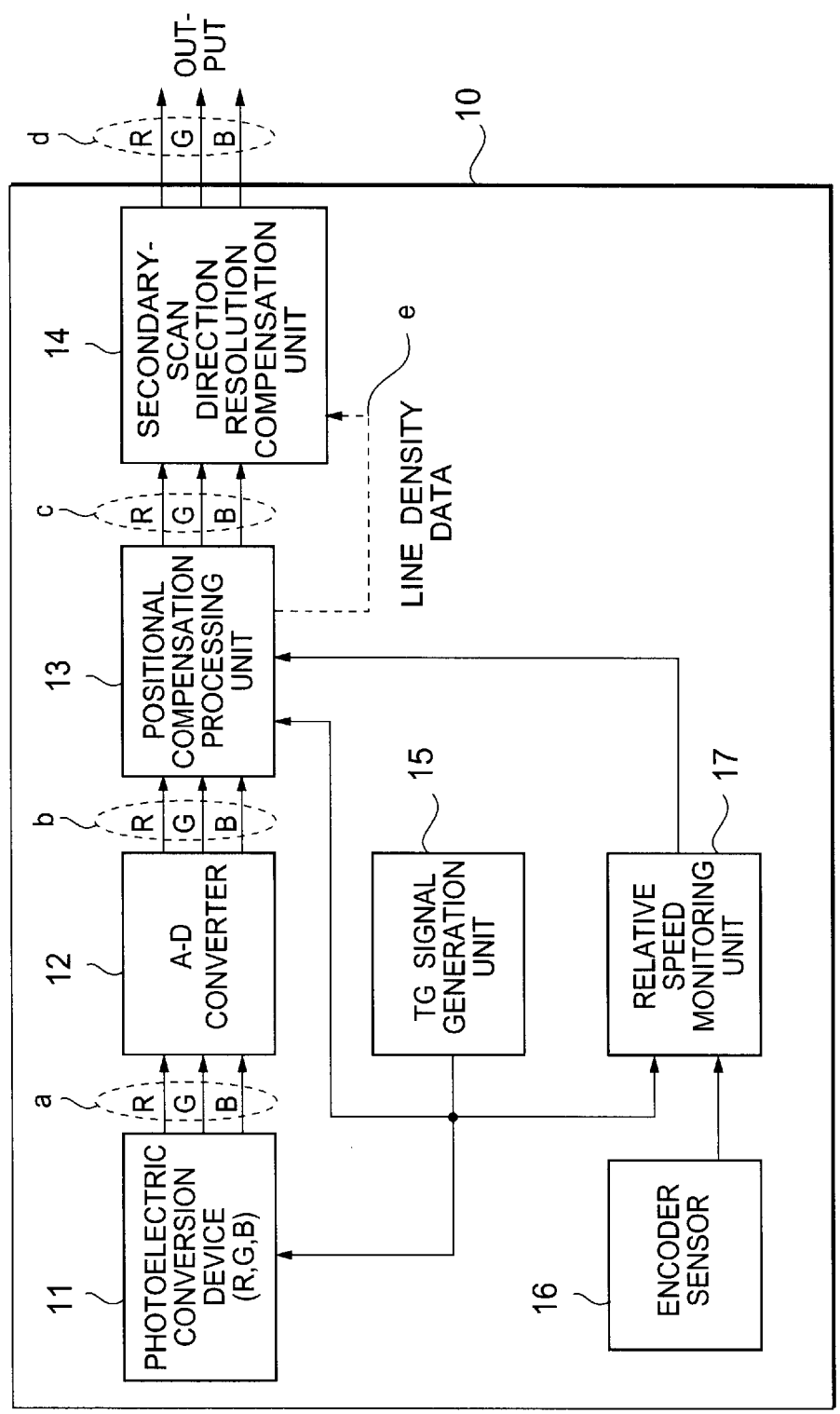
FIG. 13 is a block diagram showing the configuration of a second embodiment of the color image reader according to the present invention.

FIG. 13 is a block diagram showing another embodiment of the present invention. Referring to FIG. 13, a hand scanner 10 includes a secondary-scan direction resolution compensation unit 14 after the positional compensation processing unit 13. The positional compensation processing unit 13 outputs line density data e, as well as aligned R, G, and B signals c, to the secondary-scan direction resolution compensation unit 14. The secondary-scan direction resolution compensation unit 14 performs secondary-scan direction resolution compensation control and outputs compensated R, G, and B signals d. Secondary-scan direction resolution compensation control refers to the control of the line density in the secondary-scan direction according to the read speed. Other components are the same as those shown in FIG. 5.

As the line density data e, the relative speed data output from the F(n) stage of the relative speed data storage unit 133 shown in FIG. 6 is used.

Figure 14:
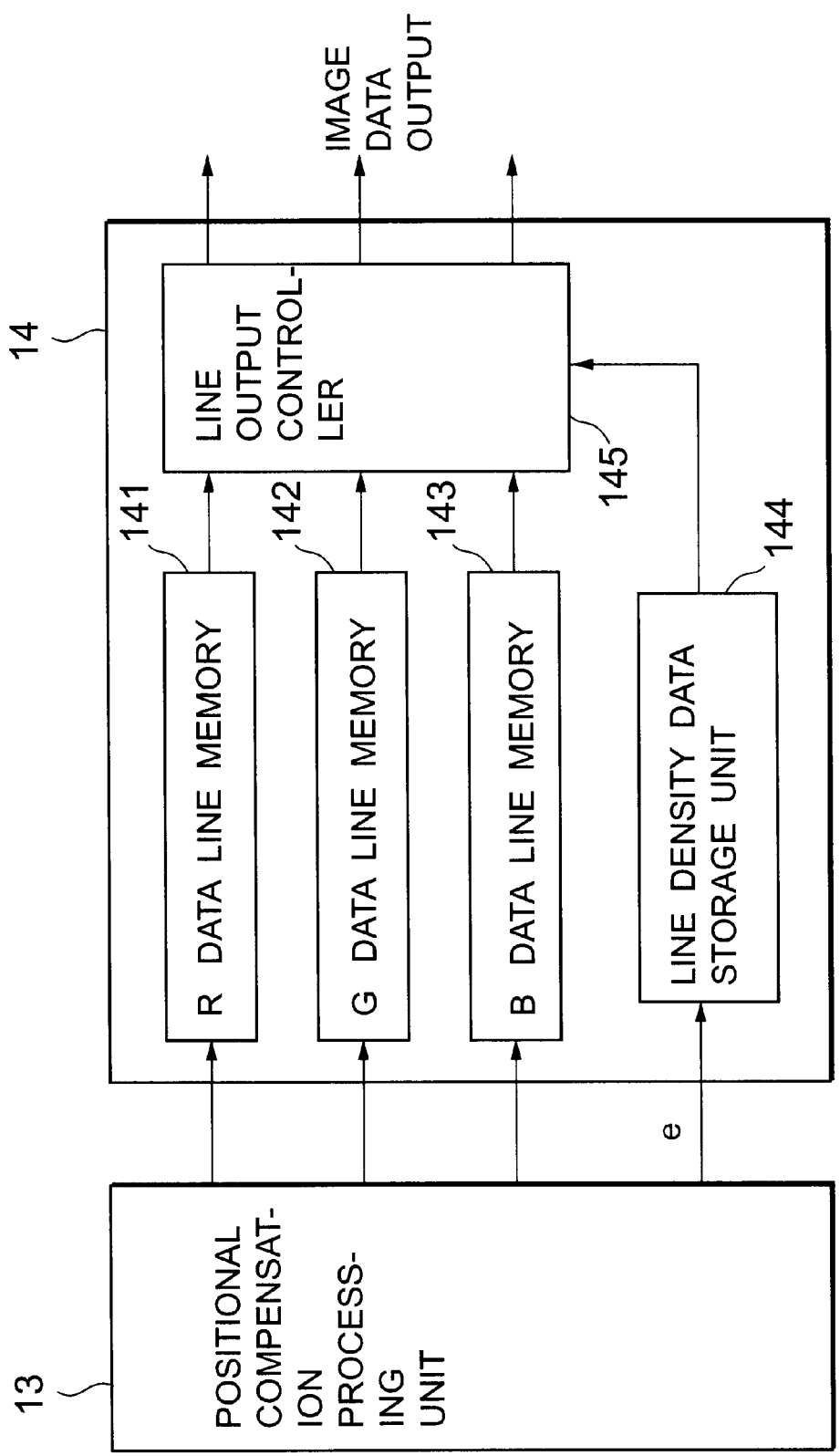
FIG. 14 is a block diagram showing an example of the configuration of a secondary-scan direction resolution compensation unit.

FIG. 14 is a block diagram showing an example of the configuration of the secondary-scan direction resolution compensation unit 14.

As shown in FIG. 14, the aligned R, G, and B signals c of the lines from the positional compensation processing unit 13 are stored in an R data line memory 141, a G data line memory 142, and a B data line memory 143, respectively. The line density data e is stored in a line density data storage unit 144. An output controller 145 outputs the R signal, G signal, and B signal stored in the R data line memory 141, G data line memory 142, and B data line memory 143 once or a plurality of times according to the line density data e stored in the line density data storage unit 144.

Figure 15:
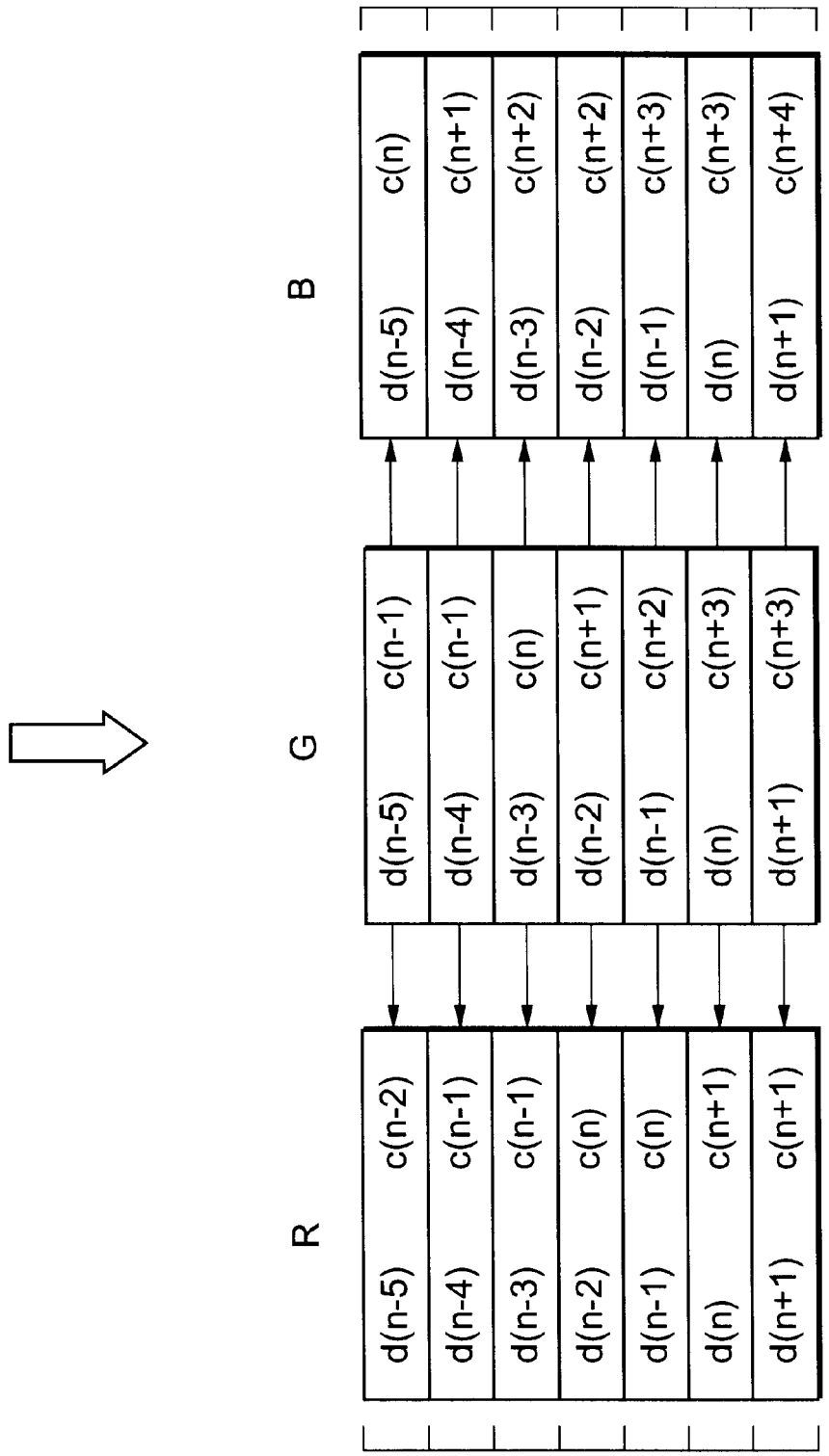
FIG. 15 is a diagram illustrating the result of secondary-scan direction resolution compensation.

Next, referring to the diagram shown in FIG. 15, the embodiment will be described more in detail. The arrow at the top of FIG. 15 indicates that FIG. 15 is associated with the description in FIG. 12.

The example shown in FIG. 8 is used again here. That is, assume that the positional compensation processing unit 13 has aligned the lines as shown in FIG. 12. The result shown in FIG. 12 indicates that the d(n−5)th line and the d(n−4)th line on the read object are output from the photoelectric conversion device 11 as one line. Similarly, the d(n)th line and the d(n+1)th line are output from the photoelectric conversion device 11 as one line. In this case, if the lines from the photoelectric conversion device 11 are treated to have the same line density, they may be partially shrunk in the secondary-scan direction.

Although such an image contain data enough for us to understand the contents, eliminating the partial shrink would give a clearer image. The hand scanner 10 of this embodiment reduces the partial shrink caused by variable-speed scanning.

In this embodiment, the line density data e, that is, the relative speed data, is output. For example, the relative speed data of "1" is output if the movement distance of the hand scanner 1 within one storage time of the photoelectric conversion device 11 is equal to or smaller than 1/300 inch. Similarly, the relative speed data of "2" is output if the movement distance is larger than 1/300 inch but equal to or smaller than equal 2/300 inch, the relative speed data of "3" if the movement distance is larger than 2/300 inch but equal to or smaller than equal 3/300 inch, and the relative speed data of "4" if the movement distance is larger than 3/300 inch.

That is, for a value that is x times the relative value (line density data e) of "1", the movement distance is x times the distance corresponding to the relative value of "1". Thus, when the line density data e of "1" is stored in the line density data storage unit 144, the output controller 145 gets the R, G, and B signals once from the R data line memory 141, G data line memory 142, and B data line memory 143, respectively, and outputs them as image data (compensated R, G, and B signals d). Also, when the line density data e of "x" (=2, 3, or 4) is stored in the line density data storage unit 144, the output controller 145 gets the R, G, and B signals x times from the R data line memory 141, G data line memory 142, and B data line memory 143, respectively, and outputs them as image data (R, G, and B signals d). That is, the same data is output x times repeatedly.

Then, as shown in FIG. 15, the image data read from the d(n−5)th, d(n−4)th, d(n−3)th, d(n−2)th, d(n−1)th, d(n)th, and d(n+1)th lines, each 1/300 inch in width, is output from the secondary-scan direction resolution compensation unit 14. Actually, however, the image data on the d(n−5)th line and that on the d(n−4)th line are the same. Similarly, the image data on the d(n)th line and that on the d(n+1)th line are the same. That is, the image data on the d(n−5)th line and that on the d(n−4)th line is the composite of the original images on those two lines, and the image data on the d(n)th line and that on the d(n+1)th line is the composite of the original images on those two lines.

However, since data included on the neighboring lines is similar, using the same data on neighboring lines would not cause any problem. This embodiment reduces a shrink in the image caused by variable-speed scanning, providing natural printed or displayed images.

The embodiments described above store the R, G, and B signals, read by the 3-line color sensor photoelectric conversion device 11, into the line memories. The signals are read from the line memories under control of the relative speed data generated from the movement distance of the hand scanner 1 or hand scanner 10. This ensures appropriate alignment even if scanning is performed at variable speeds.

Although the hand scanner 1 and hand scanner 10 are used as a color image reader in the above embodiments, the present invention may be applied to other types of color image readers. For example, with the motor rotation speed of a document movement type scanner as the relative speed data, the R, G, and B signals may be appropriately aligned even if the speed is variable.

In addition, instead of using the output of the photoelectric conversion device 11 for positional alignment as in the above embodiments, the interpolation values of image data on the neighboring lines maybe used. For example, when selecting the R signal corresponding to the G signal of C(n) in FIG. 11, the interpolation value of the R signal of C(n−1) and the R signal of C(n) may be used.

The color image reader in accordance with the present invention comprises speed monitoring means for monitoring the read speed at which a read object is read and positional compensation means for compensating the positions of image data composed of primary colors output from photoelectric conversion means. This configuration appropriately performs positional compensation for three colors, R, G, and B, according to the read speed and prevents a difference in those three colors even if the read object is read at variable speeds.

The color image reader with an additional secondary-scan direction resolution compensation unit reduces a shrink caused by reading a read object at variable speeds and therefore provides the user with natural printed or displayed images. Because, based on the monitoring result of the speed monitoring means, the secondary-scan direction resolution compensation unit compensates for a shrink in the secondary-scan direction resolution of image data composed of the primary colors output from the positional compensation means.

What is claimed is:

1. A color image reader including photoelectric conversion means on which a plurality of image sensors are arranged, each of said plurality of image sensors including a plurality of light receiving cells arranged in a primary scan direction, said color image reader comprising:

speed monitoring means for monitoring a read speed of a read object; and positional compensation means for compensating positions of image data of primary colors based on a monitoring result of said speed monitoring means, the image data being output from said photoelectric conversion means, wherein said positional compensation means sequentially stores therein the image data of the primary colors, said image data being output from said photoelectric conversion means and, when outputting the image data of one of the primary colors with said one of the primary colors as reference data, selects and outputs the image data of other primary colors from the stored image data according to the monitoring result of said speed monitoring means, said image data of the other primary colors corresponding to a position in the read object where the image data of said one of the primary colors was read.

2. The color image reader according to claim 1, wherein said positional compensation means has a plurality of line memories for the image data of the primary colors and, when outputting the image data of one of the primary colors to be used as the reference data from said plurality of line memories, selects the line memories where the image data of other corresponding primary colors is stored according to the monitoring result of said speed monitoring means, and outputs the image data from the selected line memories.

3. The color image reader according to claim 2, wherein said speed monitoring means outputs relative values for a reference speed.

4. The color image reader according to claim 3, wherein the relative values are natural numbers.

5. The color image reader according to claim 3, wherein said positional compensation means performs operation on the relative values output from said speed monitoring means to select the line memories where the image data of other primary colors is stored.

6. The color image reader according to claim 5, wherein said positional compensation means comprises:

selectors outputting the image data of the primary colors from the line memories;

a relative speed data storage unit storing therein the relative values output from said speed monitoring means; and selector controllers selecting, when outputting the image data of the reference primary color from the line memories, the line memories where the image data of other primary colors is stored based on the relative speed data stored in said relative speed data storage unit, said relative speed data corresponding to the reference color image data, and sends selection signals to said selectors.

7. The color image reader according to claim 3, further comprising a secondary-scan direction resolution compensation unit that compensates a secondary-scan direction resolution of the image data of the primary colors output by the positional compensation means.

8. The color image reader according to claim 4, further comprising a secondary-scan direction resolution compensation unit that compensates a secondary-scan direction resolution of the image data of the primary colors output by the positional compensation means, wherein said secondary-scan direction resolution compensation unit comprises:

data line memories storing therein the primary color image data output from said positional compensation means;

an output controller outputting the image data from said data line memories a number of times corresponding to the relative value for the reference speed received via said positional compensation means; and a line density data storage unit storing therein line density data.

9. The color image reader according to claim 1 wherein the color image reader comprises a hand scanner.

10. The color image reader according to claim 8 wherein the color image reader comprises a hand scanner.

* * * * *